UNITED STATES PATENT OFFICE.

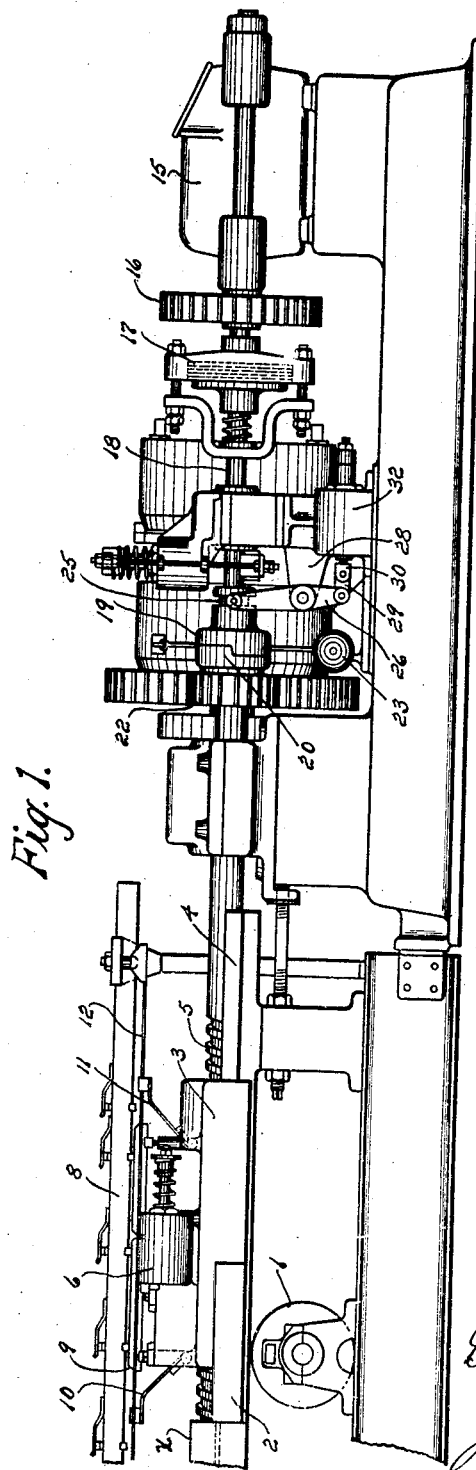

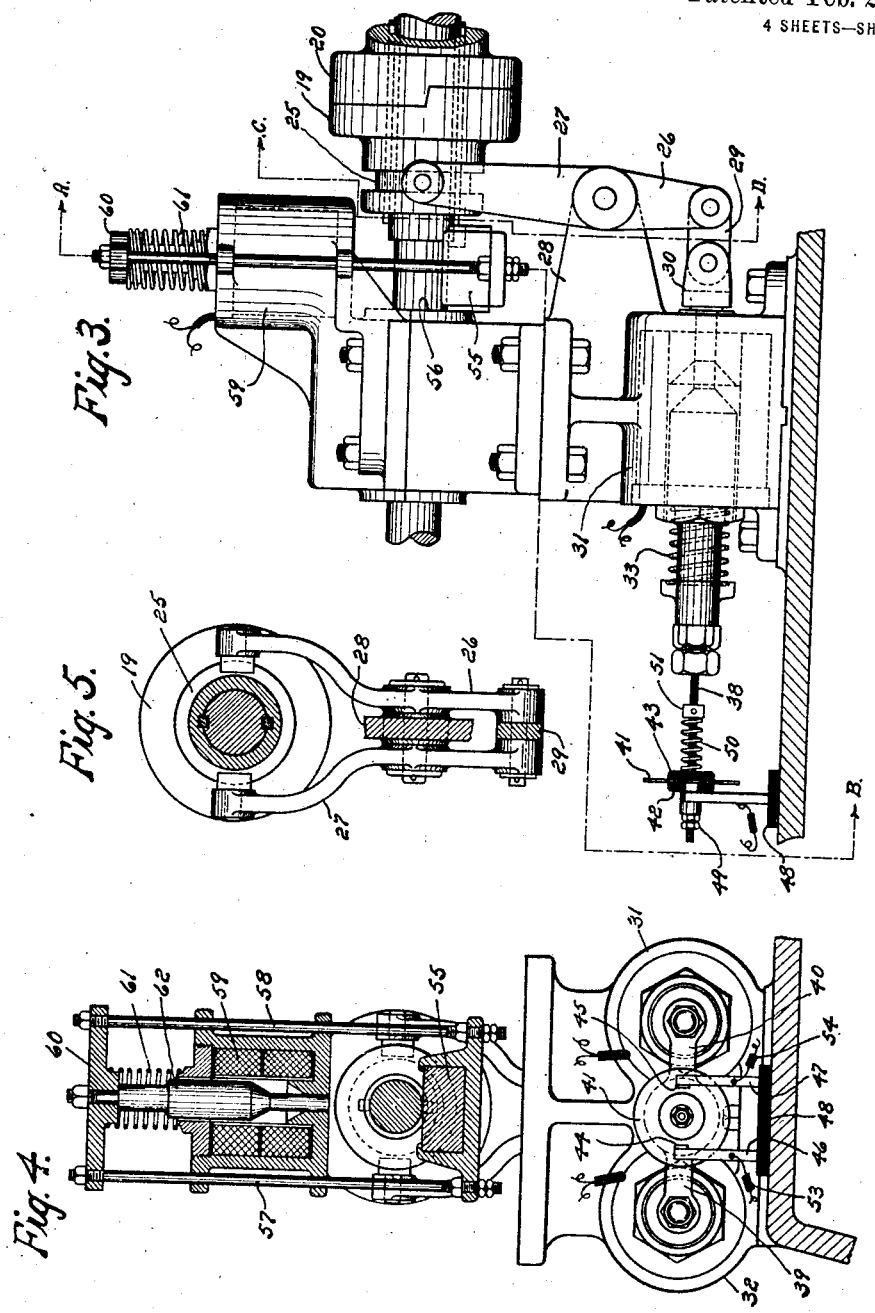

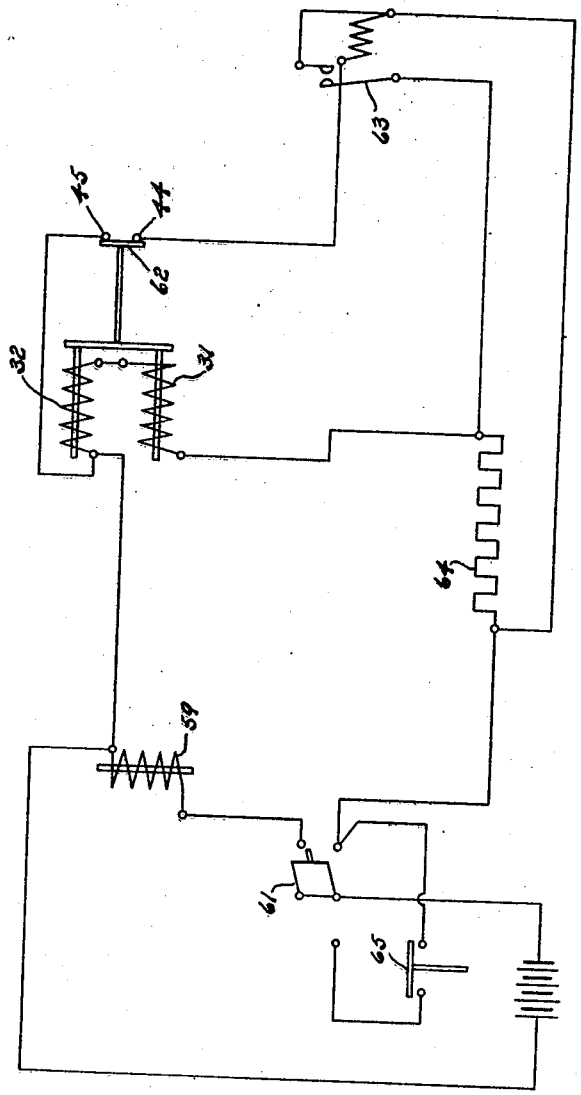

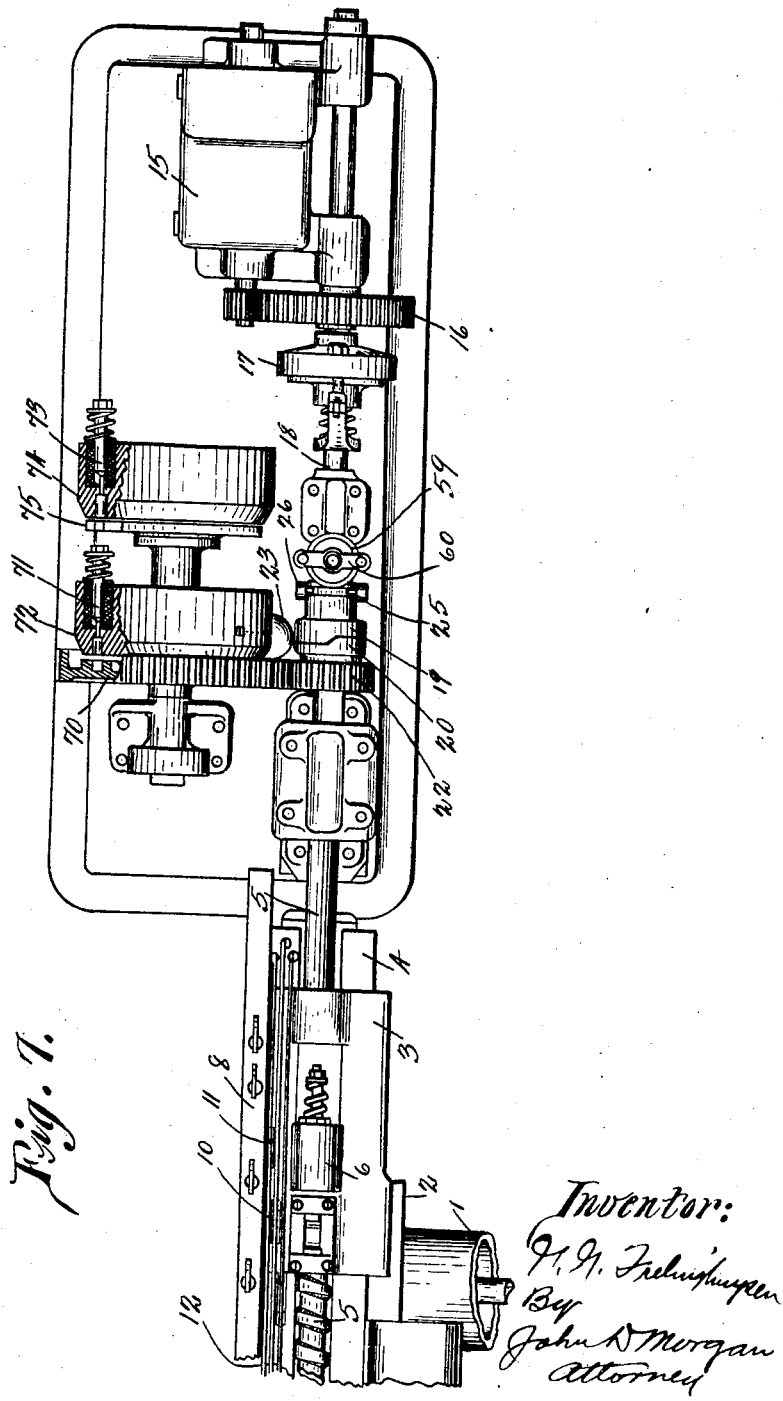

GEORGE G. FRELINGHUYSEN, OF MORRIS COUNTY, NEW JERSEY, ASSIGNOR TO STEEL UTILITIES, INCORPORATED, A CORPORATION OF NEW YORK.

DISTANCE-DETERMINING MECHANISM FOR METAL-WORKING MACHINES.

1,331,493.                  Specification of Letters Patent.      Patented Feb. 24, 1920.

Application filed February 11, 1918. Serial No. 216,510.

*To all whom it may concern:*

Be it known that I, GEORGE G. FRELINGHUYSEN, of Morris county, New Jersey, and a citizen of the United States, have made Improvements in Distance - Determining Mechanism for Metal-Working Machines, of which the following is a specification.

The invention relates to mechanism and devices for traveling and stopping metal beams, plates and the like (which may be all conveniently styled shapes) relatively to tool equipped means, such as punching mechanism, and more especially to such mechanism and devices which are capable of traveling the work widely varying successive distances, as for instance for fractions of an inch, as sixteenths of an inch, on the one hand, and on the other hand for many feet, inches and fractions of an inch, and in all cases with nice precision and exactness. In certain aspects thereof, the present invention is an improvement on the machine of U. S. Patent No. 1,241,258 to Hawthorne, dated September 25, 1917.

Objects and advantages of the invention will be set forth in part hereinafter, and in part will be obvious herefrom, or may be ascertained from practice with the invention; the same being attained and realized through the instrumentalities and combinations pointed out in the appended claims.

The invention consists in the novel parts, constructions, arrangements, combinations and improvements herein shown and described.

The accompanying drawings herein referred to and constituting a part hereof, illustrate one embodiment of the invention, and together with the description serve to explain the principles thereof.

Of the drawings:—

Figure 1 is a fragmentary side elevation of a machine embodying the invention, and corresponding in its main features to Figs. 12 and 13 of Patent No. 1,241,258, but viewed from the opposite side of Fig. 12;

Fig. 2 is a fragmentary elevation of the clutch mechanism in the central part of Fig. 1, but showing the clutch open;

Fig. 3 is a fragmentary view, on an enlarged scale, of the clutch mechanism in the central part of Fig. 1 but viewed from the opposite side;

Fig. 4 is a vertical section, substantially on the line A—B of Fig. 3;

Fig. 5 is a fragmentary, vertical section, substantially on the line C—D of Fig. 3; and Fig. 6 is a wiring diagram of certain controlling circuits constituting a part of or cooperating with the wiring system shown and described in application Ser. No. 193,011 of Wurts and Pero, filed September 24, 1917.

Fig. 7 is a top plan corresponding to Fig. 1.

In the illustrated embodiment, the invention is shown applied to, and as an improvement upon, the machine shown in Patent No. 1,241,258, issued September 25, 1917, to L. A. Hawthorne, already referred to. For clearness and brevity of explanation, certain of the parts which are shown in the drawings both of this application and of Patent No. 1,241,258 will have the reference numeral which is applied thereto in the patent appended in parenthesis after the numeral applied thereto in the present application. Thus, in the present drawings the roll 1 (1) corresponds to the roll 1 of said patent. These rolls impel the work forwardly and keep it in definite relation with the distance determining means, which means control the travel, stopping and positioning of the work relatively to the punches or other tool-equipped means.

Further, in the embodied form, the work $x$ ($x$) Fig. 1 is impelled by said rolls 1 against a head 2 (26) fixed to a carriage 3 (25) sliding along a guide 4 (15) extending along the path of travel of the work $x$. Extending along the guide 4 (15) is a rotatable screw shaft 5 (40) into engagement with which there is projected a latch operated from the distance record sheet by means of a solenoid 6 (54). The engagement of the latch and the screw shaft is controlled through a bar 8 (60) extending along the guide 4 (15) and energizing the magnet 6 (54) as in said patent. The shoe 9 (62) mounted on carriage 3 (25) runs along the bar 8 (60), and trolleys 10 (63) and 11 (115) return the current to trolley wires 12 (64) (116), as in the patent. The mechanism operates substantially the same as in the patent, cooperating with the remaining mechanisms and devices of the patent as fully set forth therein or as will be obvious therefrom, and further explanation herein is unnecessary.

The screw shaft is rotated when the carriage 3 (25) engages therewith, by a motor 15 (80) through suitable gearing 16 (78) (79) and through a friction clutch 17 (76), the rotation of the shaft and the progression and positioning of the work being controlled by the distance-determining means, which comprises disks or members traveling proportionately to the work and devices for stopping the traveling members at predetermined points to successively travel and stop the work for the exact desired successive and widely varying distances.

In Fig. 7, gear disk 70 corresponds to gear disk 82 in said Patent No. 1,241,258 and the series of solenoids 71 herein to the series of solenoids 92 in said patent. Disk 72 herein corresponds to disk 86 in the patent and disk 75 herein to disk 88 in said patent. The series of solenoids 73 herein corresponds to the series of solenoids 102 in the patent, and fixed plate 74 herein corresponds to fixed plate 89 in said Patent No. 1,241,258.

In the present invention and embodiment, means are provided for disconnecting the distance-determining devices while the motor 15 returns the work positioning carriage 3 to what may be termed initial position, that is to the position for receiving a new piece of work. In connection and coöperation with the foregoing means, mechanism is provided for acting upon the connections either directly or indirectly for permitting movement of the distance determining means between immediately successive travelings and positions of the work preparatory to the second or following of such travelings and positionings, this being done without affecting the measuring relation or control of the distance determining device over the work. Such movement of the distance determining means may be conveniently termed a restoring movement or restoration thereof.

The embodied form of means for disassociating the distance determining means from the screw shaft comprises a clutch automatically operated from the distance record sheet or other automatic or central control, and the mechanism for permitting an intermediate control of the work, above referred to, comprises mechanism which eases the clutch so as to permit an automatic pressure device such as a spring or weight or other suitable device, to restore the distance determining means without disconnecting or affecting the various means and mechanisms in their measuring relation. In the present embodied form of such means, a clutch member is yieldingly thrown out by solenoids working against a spring, and an interponent is movable into and out of the path of the clutch member to permit, respectively, either an easing of the clutch merely or an entire throwing out thereof. That is, when there are successive measurements of the advancing work, and a restoration of the inch and sixteenths-of-an-inch disks are required between the successive readings, the interponent is positioned to permit only an easing of the clutch so that the disks may rotate back to initial position without changing the rotational relation of the screw shaft to the entire measuring device. When, however, screwshaft 5 is reversely rotated to take carriage 3 back to its initial or work-receiving position, the interponent is positioned so that the clutch is allowed to move back into the free or disengaged position, and in its reverse rotation the screw shaft is entirely free from the measuring device.

As embodied, mounted on shaft 18 (75) which is a part or continuation of shaft 5, to rotate therewith, but slidable therealong between engaging and disengaging positions, is a clutch member 19. Coöperating therewith is a clutch member 20 sleeved on shaft 18, the sleeve 21 having fixed thereto the pinion 22 (81) of the distance determining device.

The present form of distance determining means, so far as relates to this aspect of the present invention, is used to effect and control the measurement of inches and sixteenth-of-an-inch, and is the same in principle and substantially the same in structure as the mechanism shown in detail in Figs. 7, 8, 9, 10, 12 and 13 of said Hawthorne Patent No. 1,241,258 and described therein. The weight and cord 23 herein corresponds to the spring 107 in said patent.

Referring more in detail to the illustrated embodiment, (see especially Figs. 1, 2, 3, and 5), clutch member 19 has an annular groove 25 formed therein. A lever 26 has its upper end formed as a yoke 27 straddling and engaging the annular groove 25. Lever 26 is pivoted on a bracket 28 extending from the machine frame. At its lower end lever 26 is pivoted to a link 29, which is also pivoted to a head 30, connected to the cores of two solenoids 31 and 32 (Figs. 1, 3 and 4) which solenoids are mounted on the machine frame. The solenoid cores are restored when deënergized by a spring or springs 33 (Fig. 3).

A circuit controlling device is operated by the solenoids 31 and 32. This device comprises a rod 38 fixed to and extending from the solenoid cores, and is attached thereto by arms or brackets 39 and 40, respectively. Mounted on rod 38 is a disk 41, which acts as a bridge piece to close an electrical circuit, the disk being insulated from the rod by collars 42 and 43 of insulating material. Mounted on insulating base 48 and in alinement with disk 41 are two contact-bearing posts 46 and 47 carrying respectively contacts 44 and 45. The circuit wires 53 and 54 are connected to the respective contacts (Figs. 3 and 4).

A resilient mounting of the disk 41 on rod 38 is preferably provided, and for this purpose a collar 49 is threaded on rod 38 to bear against collar 42. On the opposite side of the disk 41, and bearing against collar 43 is a spring 50, coiled about rod 38 and bearing against a collar 51 fixed to the rod.

The foregoing mechanism will throw in and out the clutch through the control of the circuit operating on solenoids 31 and 32, and the mechanism for modifying the clutch action is controlled through contacts 44 and 45. In the embodied form, an interponent is provided movable to permit the clutch 19, 20 to be thrown completely out or to permit only a partial disengagement or easing thereof, whereby the connections to the rotating disks of the distance determining device are eased or released sufficiently for the retraction of the solenoid pins and for the weight 23 to restore the device.

In the embodied form of the foregoing, an interponent 55 is movable into and out of position between the hub of the clutch member 19 and an abutment or contact surface 56 on the machine frame. Interponent 55 is mounted on rods 57 and 58, slidable longitudinally in bearings in the frame of a solenoid 59, mounted on the machine frame. Rods 57 and 58 are connected by a cross piece 60, and are impelled into the upward position in Figs. 3 and 4 by a spring 61 coiled about core 62 of solenoid 59. When solenoid 59 is energized, the interponent 55 is moved downwardly to permit the total disengagement of clutch 19, 20, to permit motor 15 to drive shaft 5 in the reverse direction to restore carriage 3 to work receiving position. When solenoid 59 is deenergized, spring 61 holds interponent 55 in position to merely permit the easing of clutch 19, 20, to permit the restoring action of the distance determining device, as already described. That is, when solenoid 59 is deënergized, spring 61 will hold the block or interponent 55 up behind clutch member 19, as shown in Fig. 3, and when solenoids 31 and 32 are energized, clutch member 19 will be moved out or back only until it strikes the interponent 55. That is, the clutch will be merely eased so that the inch and sixteenths-of-an-inch measuring disks may be restored by weight 23. When, however, it is desired to reverse the rotation of screw shaft 5 and run carriage 3 back to work-receiving position, solenoid 59 is energized and block or interponent 55 is moved downwardly against spring 61 out of the path of clutch member 19, as shown in Fig. 2. Now, when solenoids 31 and 32 are energized, clutch member 19 will move back into the disengaging position, as shown in Fig. 2, and screw shaft 5 will run disconnected from the measuring devices.

Referring now to the diagram of Fig. 6, and its manner of operation:—

When switch 61 is closed in right hand position, to return the carriage 3 to zero, coils 59, 31 and 32 are energized to disengage the clutch 19, 20. Interlock 62 is closed at the start, completing the circuit at 44 and 45, which closes contactor 63, and the circuit is completed around resistance 64.

When the clutch begins to open, contact 62 opens, contactor 63 drops out, and the circuit is then made through resistance 64, which prevents heating of coils of solenoids 31 and 32, but permits the use of a heavy current for starting.

For automatic running switch 61 is set closed in left hand position, and when automatic switch 65 is closed, (this being done preferably by the movement of the punch) solenoids 31 and 32 are energized as before, to open the clutch and release the stop pins.

Coil 59 being out of circuit or dead, in this position, the interponent 55 prevents the clutch jaws 19, 20 from entirely disengaging, and the clutch drops in again on the opening of the circuit, at 65 due to the continued movement of the punch.

The invention in its broader aspects is not limited to the exact structures shown and described, but changes may be made therein without departing from the principles of the invention and without sacrificing its chief advantages.

What I claim is:—

1. A machine for traveling and positioning metal shapes relatively to tool equipped means, including in combination devices traveling proportionately to the shape, coöperating devices for arresting the traveling devices at a predetermined point, and restoring mechanism for said coöperating arresting devices including means for modifying the coöperation of the proportionately traveling device and the coöperating arresting device.

2. A machine for traveling and positioning metal shapes relatively to tool equipped means, including in combination devices traveling proportionately to the shape, coöperating devices for arresting the traveling devices at a predetermined point, and restoring mechanism for said coöperating arresting devices, including a pressure device acting on the arresting device and tending to restore it and a device modifying the action of the proportionately traveling device and the arresting device to permit the pressure device to restore the arresting device.

3. A machine for traveling and positioning metal shapes relatively to tool equipped means, including in combination devices traveling proportionately to the shape, coöperating devices for arresting the traveling devices at a predetermined point, connections therebetween, and restoring mechanism for said coöperating arresting devices, including means including a device acting on said connections to restore said arresting means.

4. A machine for traveling and positioning metal shapes relatively to tool equipped means, including in combination devices traveling proportionately to the shape, coöperating devices for arresting the traveling devices, at a predetermined point, connections therebetween, and restoring mechanism for said coöperating arresting devices including a pressure device acting on the arresting device and tending to restore it and a device acting on said connections and modifying the action of the proportionately traveling device and the arresting device to permit the pressure device to restore the arresting device.

5. A machine for traveling and positioning metal shapes relatively to tool equipped means, including in combination a member coöperating with the work and traveling proportionately thereto, a mechanism representing distance values, connections therebetween and restoring means for the distance value mechanism including devices acting on said connections.

6. A machine for traveling and positioning metal shapes relatively to tool equipped means, including in combination a member coöperating with the work and traveling proportionately thereto, a mechanism representing distance values, connections therebetween, and restoring means for the distance value mechanism including a pressure device tending to restore the distance value mechanism and devices acting on said connections.

7. A machine for traveling and positioning metal shapes relatively to tool equipped means, including in combination a member traveling proportionately to the work, a motor, a mechanism representing distance values and controlling the travel of said member, a clutch between the distance value mechanism and the member and motor, and restoring means for the distance value mechanism including a device acting on said clutch.

8. A machine for traveling and positioning metal shapes relatively to tool equipped means, including in combination a member traveling proportionately to the work, a motor, a mechanism representing distance values and controlling the travel of said member, a clutch between the distance value mechanism and the member and the motor, and restoring means for the distance value mechanism, and means for easing said clutch for the restoration of the distance value mechanism and for disconnecting said clutch during the restoration of the proportionately traveling member.

9. A machine for traveling and positioning metal shapes relatively to tool equipped means, including in combination a shaft traveling proportionately to the work, a motor for rotating said shaft, a mechanism representing distance values and controlling the rotation of said shaft, a clutch between the shaft and distance value mechanism, and means for easing or throwing out the clutch.

10. A machine for traveling and positioning metal shapes relatively to tool equipped means, including in combination a shaft traveling proportionately to the work, a motor for rotating said shaft, a mechanism representing distance values and controlling the rotation of said shaft, a clutch between the shaft and distance value mechanism and a friction drive between the motor and shaft, and means for easing or throwing out the clutch.

11. A machine for traveling and positioning metal shapes relatively to tool equipped means, including in combination a shaft traveling proportionately to the work, a motor for rotating said shaft, a mechanism representing distance values and controlling the rotation of said shaft, a clutch between the shaft and distance value mechanism and a restoring device for the distance value mechanism, and means for easing or throwing out the clutch.

12. A machine for traveling and positioning metal shapes relatively to tool equipped means, including in combination a shaft traveling proportionately to the work, a motor for rotating said shaft, a mechanism representing distance values and controlling the rotation of said shaft, and a clutch between the shaft and distance value mechanism and a restoring device for the distance value mechanism and means for easing the clutch during the operation of the restoring device.

13. A machine for traveling and positioning metal shapes relatively to tool equipped means, including in combination a shaft traveling proportionately to the work, a motor for rotating said shaft, a mechanism representing distance values and controlling the rotation of said shaft, a clutch between the shaft and distance value mechanism and a restoring device for the distance value mechanism, and a friction drive between the motor and shaft, and means for easing or throwing out the clutch.

14. A machine for traveling and positioning metal shapes relatively to tool equipped means, including in combination a shaft traveling proportionately to the work, a motor for rotating said shaft, a mechanism representing distance values and controlling the rotation of said shaft, and a clutch between the shaft and distance value mechanism and a restoring device for the distance value mechanism and means for easing the clutch during the operation of the restoring device and a friction drive between the motor and shaft.

15. A control for work positioning means for a metal working machine including a distance determining device, a clutch therefor, and means coöperating automatically with the distance determining device for throwing the clutch partially out or completely out.

16. A machine for traveling and positioning metal shapes relatively to tool equipped means, including in combination devices traveling proportionately to the shape, coöperating devices for arresting the traveling devices at a predetermined point, and restoring mechanism for said coöperating arresting devices including electrically operated means for modifying the coöperation of the proportionately traveling device and the coöperating arresting device.

17. A machine for traveling and positioning metal shapes relatively to tool equipped means, including in combination devices traveling proportionately to the shape, coöperating devices for arresting the traveling devices at a predetermined point, and restoring mechanism for said coöperating arresting devices including a pressure device acting on the arresting device and tending to restore it and an electro-magnetic device modifying the action of the proportionately traveling device and the arresting device to permit the pressure device to restore the arresting device.

18. A machine for traveling and positioning metal shapes relatively to tool equipped means, including in combination devices traveling proportionately to the shape, coöperating devices for arresting the traveling devices at a predetermined point, connections therebetween, and restoring mechanism for said coöperating arresting devices including means including an electrically operated device acting on said connections to restore said arresting means.

19. A machine for traveling and positioning metal shapes relatively to tool equipped means, including in combination devices traveling proportionately to the shape, coöperating devices for arresting the traveling devices at a predetermined point, connections therebetween, and restoring mechanism for said coöperating arresting devices including means including an electric circuit and magnetic means operated thereby to control a device acting on said connections to restore said arresting means.

20. A machine for traveling and positioning metal shapes relatively to tool equipped means, including in combination a member traveling proportionately to the work, a motor a mechanism representing distance values and controlling the travel of said member, a clutch between the distance value mechanism and the member and motor, and restoring means for the distance value mechanism, and means operated by an electric circuit for easing said clutch for the restoration of the distance value mechanism and for disconnecting said clutch during the restoration of the proportionately traveling member.

21. A machine for traveling and positioning metal shapes relatively to tool equipped means, including in combination a shaft traveling proportionately to the work, a motor for rotating said shaft, a mechanism representing distance values and controlling the rotation of said shaft, and a clutch between the shaft and distance value mechanism and an electric circuit operated automatically in coöperation with the distance value mechanism and a magnetic device therein for controlling said clutch.

22. A control for work positioning means for a metal working machine including a distance determining device, a clutch therefor, means coöperating automatically with the distance determining device for throwing out the clutch, and means acting to prevent a complete throwing out thereof.

23. A control for work positioning means for a metal morking machine including a distance determining device a clutch therefor, electrically operated means for throwing out the clutch, and electrically operated means acting to prevent a complete throwing out thereof.

24. A clutch mechanism including in combination a shaft, a clutch, means for throwing out the clutch, and means coöperating therewith to permit only a partial throwing out of the clutch and a distance determining mechanism controlling the clutch.

25. A clutch mechanism including in combination a shaft, a clutch, electro-magnetic circuit-controlled means for throwing out the clutch, and electro-magnetic circuit-controlled means coöperating therewith to permit only a partial throwing out of the clutch and a distance determining mechanism controlling the clutch.

In testimony whereof, I have signed my name to this specification, in the presence of two subscribing witnesses.

GEORGE G. FRELINGHUYSEN.

Witnesses:
 ERNEST M. TAPNER,
 JOHN D. MORGAN.